United States Patent
Cowley et al.

(10) Patent No.: US 9,882,472 B2
(45) Date of Patent: Jan. 30, 2018

(54) TECHNIQUES FOR POWER SUPPLY TOPOLOGIES WITH CAPACITANCE MANAGEMENT TO REDUCE POWER LOSS ASSOCIATED WITH CHARGING AND DISCHARGING WHEN CYCLING BETWEEN POWER STATES

(71) Applicant: Intel Corporation, Santa Clara, CA (US)

(72) Inventors: Nicholas P. Cowley, Wroughton (GB); Ruchir Saraswat, Swindon (GB); Richard J. Goldman, Cirencester (GB); David T. Bernard, Ieixlip (IE); Gordon J. Walsh, Leopardstown (IE); Michael Langan, Ieixlip (IE)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 14/496,838

(22) Filed: Sep. 25, 2014

(65) Prior Publication Data
US 2016/0094121 A1    Mar. 31, 2016

(51) Int. Cl.
*G05F 1/56* (2006.01)
*H02M 3/156* (2006.01)
(Continued)

(52) U.S. Cl.
CPC .............. *H02M 3/156* (2013.01); *G05F 1/56* (2013.01); *H02M 1/36* (2013.01); *H02M 2001/009* (2013.01)

(58) Field of Classification Search
CPC .............. G05F 1/10; G05F 1/56; H02M 3/156
(Continued)

(56) References Cited

U.S. PATENT DOCUMENTS 7,821,244 B1 * 10/2010 Signoretti ............. H02M 3/158
                                                                    323/271
8,085,021 B2   12/2011 Chen et al.
(Continued)

FOREIGN PATENT DOCUMENTS

CN    101120618 A    2/2008
CN    101599693 A    12/2009
(Continued)

OTHER PUBLICATIONS

SLPT034C ("Battery Management Solutions for wearable and Fitness Devices," http://www.ti.com/lit/ml/slpt034c/slpt034c.pdf, Texas Instruments, Aug. 18, 2014).*
(Continued)

*Primary Examiner* — Jue Zhang
*Assistant Examiner* — Jye-June Lee
(74) *Attorney, Agent, or Firm* — Grossman, Tucker, Perreault & Pfleger, PLLC (57) ABSTRACT

In at least one embodiment there is provided a method for managing bulk capacitance of a power supply system. The method includes precharging first and second bulk capacitors of the power supply system to approximately a first output voltage level and a second output voltage level, respectively; receiving a first command signal to generate, by the power supply, the first output voltage level; coupling the first bulk capacitance to load circuitry coupled to the power supply; receiving a second command signal to generate, by the power supply, the second output voltage level; and coupling the second bulk capacitance to the load circuitry coupled to the power supply.

22 Claims, 5 Drawing Sheets

(51) Int. Cl.
*H02M 1/36* (2007.01)
*H02M 1/00* (2006.01)

(58) Field of Classification Search
USPC .................................................. 323/273, 282
See application file for complete search history.

(56) References Cited

U.S. PATENT DOCUMENTS

| 8,212,392 | B2 | 7/2012 | Pickholz et al. | |
|---|---|---|---|---|
| 2002/0036431 | A1 | 3/2002 | Vogman | |
| 2007/0115695 | A1 | 5/2007 | Lou et al. | |
| 2008/0129219 | A1 | 6/2008 | Smith et al. | |
| 2009/0237046 | A1* | 9/2009 | Hsieh | H02M 3/07 323/273 |
| 2010/0026252 | A1* | 2/2010 | Lin | G05F 1/56 323/275 |
| 2010/0181974 | A1* | 7/2010 | Chen | G05F 1/575 323/282 |
| 2010/0264890 | A1* | 10/2010 | Caldwell | G05F 1/56 323/282 |
| 2014/0285014 | A1* | 9/2014 | Calhoun | H02M 3/158 307/31 |

FOREIGN PATENT DOCUMENTS

| EP | 2290794 A1 | 3/2011 |
|---|---|---|
| TW | 1357543 | 2/2012 |
| TW | 201423300 A | 6/2014 |

OTHER PUBLICATIONS

International Search Report and Written Opinion received for PCT Application No. PCT/US2015/047748, dated Dec. 7, 2015, 13 pages.
Taiwanese Office Action and Search Report issued in Taiwanese Application No. 104127376, dated Dec. 13, 2016, with English translation of Search Report, 1 page of English translation and 8 pages of Taiwanese Office Action and Search Report.
International Preliminary Report on Patentability and Written Opinion issued in PCT Application No. PCT/US2015/047748, dated Apr. 6, 2017, 10 pages.
Chinese Office Action issued in Chinese Application No. 201580045329.2, dated Sep. 15, 2017, with English machine translation, 26 pages.

* cited by examiner

TECHNIQUES FOR POWER SUPPLY TOPOLOGIES WITH CAPACITANCE MANAGEMENT TO REDUCE POWER LOSS ASSOCIATED WITH CHARGING AND DISCHARGING WHEN CYCLING BETWEEN POWER STATES

FIELD

The present disclosure relates to power supply topologies with capacitance management.

BACKGROUND

It is desirable in, for example, wearable or Internet of Things (IoT) devices, to minimize battery power drain to prolong operational life. Such devices typically have a number of operational modes including a state sometimes referred to as retention power saving where the supply voltage is reduced to a level compatible with retaining information, but too low for any functional activity. The purpose of the reduction in supply voltage is to reduce the both the active and leakage power associated with any circuit blocks associated with the supply. The device may spend a significant percentage of time in this mode hence it is desirable to minimize power drain and hence increase operational life. It is a common feature of such devices where the power supply is periodically brought out of retention for a short period of activity, for example to respond to an interrupt, or to receive a signal from a second device.

The supply voltage will typically have a large associated bulk capacitor to provide supply decoupling. The combination of this bulk capacitor and the repetitive transitioning in and out of retention state results in 'lost' power associated with charge and discharge of the bulk capacitor. Effects of bulk capacitor charging has not previously been considered or regarded as problematic since in previous applications the supply voltage can be considered as effectively stable and any current associated with the bulk capacitor charging is insignificant compared to the load current. For example DVFS (voltage and frequency scaling) may be applied to reduce supply voltage in response to activity in normal operation mode where the active current is far greater than the bulk cap charge current. The net consequence of this effect is to undesirably shorten the battery life and/or periods between recharging.

For example, in some process nodes the normal operation voltage may be 1.8V and the retention voltage may be 1.2V and in some wearable devices the supply may transition between these two voltage nodes between 10 to 100 times a second and the bulk capacitance may be 10 uF. The power associated with transitioning the voltage on the bulk capacitor is analogous to the power in CMOS circuits associated with clocking the CMOS gates which can be calculated from the well-known formula:

Power=$C_{gate} \times V_{cc}^2 \times freq = V_{cc} \times I_{charge}$.

Substituting above conditions:

$I$ charge=10 uF×(1.8−1.2)×10=60 uA

Therefore the average current drain associated with transitioning the bulk capacitor 10 times a second is 60 uA, which is unacceptable in the context of retention current being typically <1 uA In addition, in application the supply rail has to be dynamically switched by, for example, a switched mode regulator between the two voltage states to benefit from the lower current in retention voltage since the retention current is insufficient to discharge the bulk cap in an acceptable time to deliver any power saving benefits. For example consider the above example in 10 msec a current of 1 uA will only discharge a 10 uF capacitor by 1 mV therefore without active switching the device will never enter retention voltage state. It will actually take 6 seconds to fully transition by discharge alone (assuming a constant load of 1 uA).

It may be therefore argued that retention power saving can never be realistically implemented in applications where the device exits retention setting at a low Hz repetition rate unless the voltage source contains a means to actively transition between the voltage levels, which will consume power.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Figure 1:
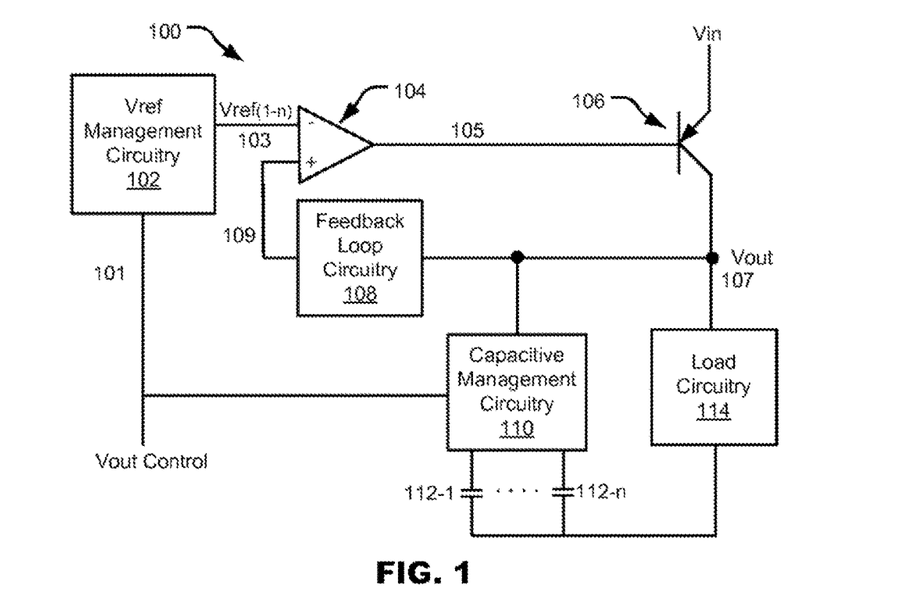
FIG. 1 illustrates a power supply system consistent with various embodiments of the present disclosure.

FIG. 1 illustrates an example of a power supply system 100 consistent with various embodiments of the present disclosure. In this example, the power supply system 100 is a linear regulator power supply, for example, an analog (LDO), digital or mixed-signal linear regulator. The system 100 includes reference voltage (Vref) management circuitry 102 configured to generate at least one reference signal (Vref(1-$n$)) 103 based on an output level control signal (Vout control) 101. The system 100 also includes comparator circuitry 104 configured to compare the reference signal 103 to a feedback signal 109 indicative of, or proportional to, an output voltage Vout 107. System 100 also includes a power switch circuitry 106 configured to generate the output voltage Vout 107 based on, at least in part, an input voltage Vin. The power switch circuitry 106 is depicted in FIG. 1 as a BJT transistor, however, in other embodiments the power switch circuitry 106 may include of switch technologies such as MOSFET, SiC, etc. An output signal 105 of the comparator circuitry 104 may be used to control a conduction state of the power switch circuitry 106 to generate a controllable output voltage Vout 107 that substantially matches a voltage level of the reference signal 103. For example, output signal 105 may be used to control the base region of power switch circuitry 106 such that the power switch circuitry 106 operates in a linear region to provide a controlled output voltage 107. The system 100 may also include feedback loop circuitry 108 coupled between Vout 107 and the comparator circuitry 104 and configured to provide filtering and/or phase shifting for the feedback loop, for example, by filtering AC signal content of Vout 107, controlling gain stability of the feedback loop to ensure negative feedback, level shifting and/or division of Vout, etc. The comparator circuitry 104, power switch circuitry 106 and feedback loop circuitry 108 may collectively be referred to herein as "power train circuitry".

The output level control signal 101 may be generated by a baseband power management system (e.g., baseband controller, not shown) and/or other power management system (not shown) and is generally indicative of, or proportional to, a desired output voltage Vout 107. For example, the output control signal 101 may include a first output level signal indicative of a full power state and a second output level signal indicative of a low power state. Vref management circuitry 102 may generate corresponding reference signals 103 based on the output control signal 101. Thus, Vref management circuitry 102 may generate a first reference signal 103 indicative of a full power operational state so that the output voltage 107 is a first output voltage level (Vout1) and a second reference signal indicative of a retention power saving state so that the output voltage 107 is a second output voltage level (Vout2), where Vout1>Vout2.

The output voltage 107 may be used to power load circuitry 114. The load circuitry may include, for example, IoT, wearable and/or other low-power devices, although the present disclosure is not limited to the type of load that may be coupled to the power train circuitry. The present disclosure includes a plurality of bulk capacitors 112-1, ..., 112-n, which may be selected and coupled to the load circuitry 114. In some embodiments, the number of bulk capacitors 112-1, ..., 112-n may generally correspond to the number of power states as reflected by the number of different reference signals 103 that may be generated based on the output control signal 101. The system 100 also includes capacitive management circuitry 110 configured to control a precharge of the plurality of bulk capacitors 112-1, ..., 112-n and couple at least one of the plurality of capacitors 112-1, ..., 112-n to the load circuitry based on the output control signal 101. In some embodiments, the capacitive management circuitry 110 is configured to precharge each respective bulk capacitor 112-1, ..., 112-n to a corresponding output voltage level. For example, the capacitive management circuitry may be configured to precharge a first bulk capacitor (e.g., 112-1) to a first voltage level that corresponds to the first output voltage (Vout1) 107 generated using the first reference voltage Vref1 103 and a second bulk capacitor (e.g., 112-2) to a second voltage level that corresponds to the second output voltage (Vout2) 107 generated using the second reference voltage Vref2, etc. In operation, control signal 101 may command Vref management circuitry 102 to change output power states (e.g., from Vout1 to Vout2, or vice-versa), the capacitive management circuitry 110 may couple a selected bulk capacitor 112-1, ..., 112-n to the load circuitry 114 that is precharged to the selected output power state, and decouple the bulk capacitor 112-1, ..., 112-n associated with the previous output power state from the load circuitry 114. Thus, power drain associated with charging and discharging the capacitors 112-1, ..., 112-n when cycling between power states may be reduced or eliminated, and thus significant power savings may be realized when transitioning (cycling) between power states.

Each bulk capacitor 112-1, ..., 112-n may be precharged during prior operational cycles of the power supply system 100. In this regard, when a bulk capacitor 112-1, ..., 112-n is decoupled from the load circuitry 114, it may remain in an open circuit configuration so that the charge on any decoupled bulk capacitor 112-1, ..., 112-n remains relatively stable for the next power cycle. To that end, the capacitance of each bulk capacitor 112-1, ..., 112-n may sized so that the time constant associated with a bulk capacitor is larger than the cycling time between output voltage modes. In still other embodiments, the power supply system of FIG. 1 may be controlled for initialization operations during which the bulk capacitors 112-1, ..., 112-n are each charged to an appropriate level.

Figure 6A:
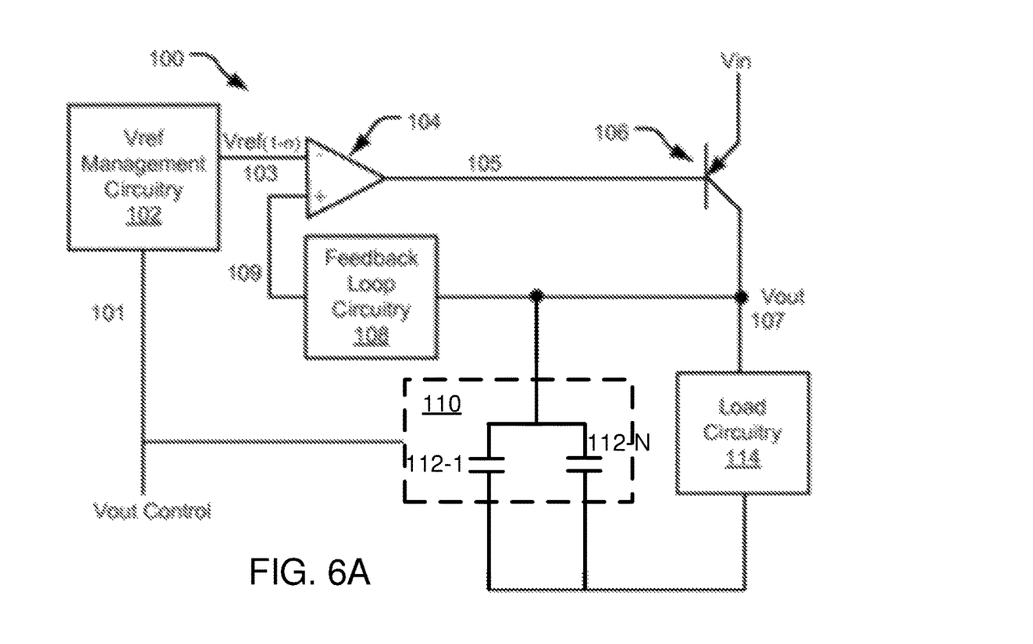
FIGS. 6A and 6B collectively illustrate a power supply system consistent with the present disclosure.
Figure 6B:
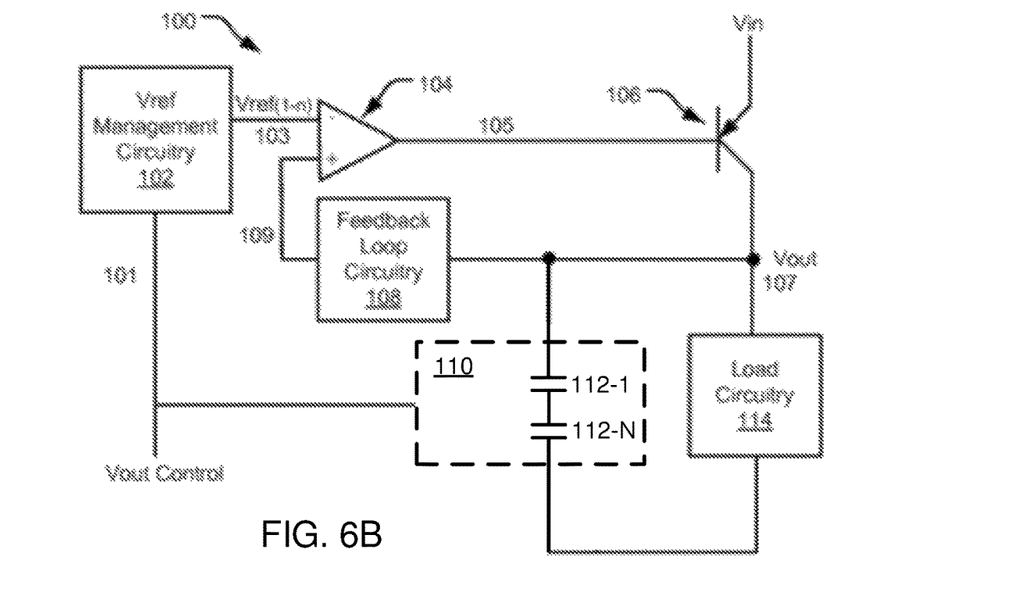

In some embodiments, at least one bulk capacitor 112-1, ..., 112-n may be formed of a plurality of individual capacitors coupled in a parallel, as shown in FIG. 6A, and/or series arrangement, as shown in FIG. 6B. In such an embodiment, the capacitive management circuitry 110 may be configured to couple the plurality of capacitors of a bulk capacitor (see e.g., 112-1) in series for a first output power state and in parallel for a second output power state. Also in such an embodiment, each of the plurality capacitors of the bulk capacitor may be precharged to the same level, e.g., Vout1 and the capacitive management circuitry 110 may couple the plurality of capacitors in series when control signal 101 indicates the first output voltage (Vout1) and in parallel when the control signal 101 indicates the second voltage level (e.g., Vout2). Of course, in other embodiments, hybrid series/parallel coupling may be used. Such embodiments may avoid any momentary loss of capacitive load when switching from a first output voltage state to a second output voltage state, and avoid charging each bulk capacitor to a separate precharge level. While the above examples make specific reference to a first and second output voltage state, and thus first and second capacitors 112-1 and 112-2, it should be understood that the power supply system 100 of the present disclosure may enable three or more output voltage levels, and thus, three or more bulk capacitors may be used.

Figure 2:
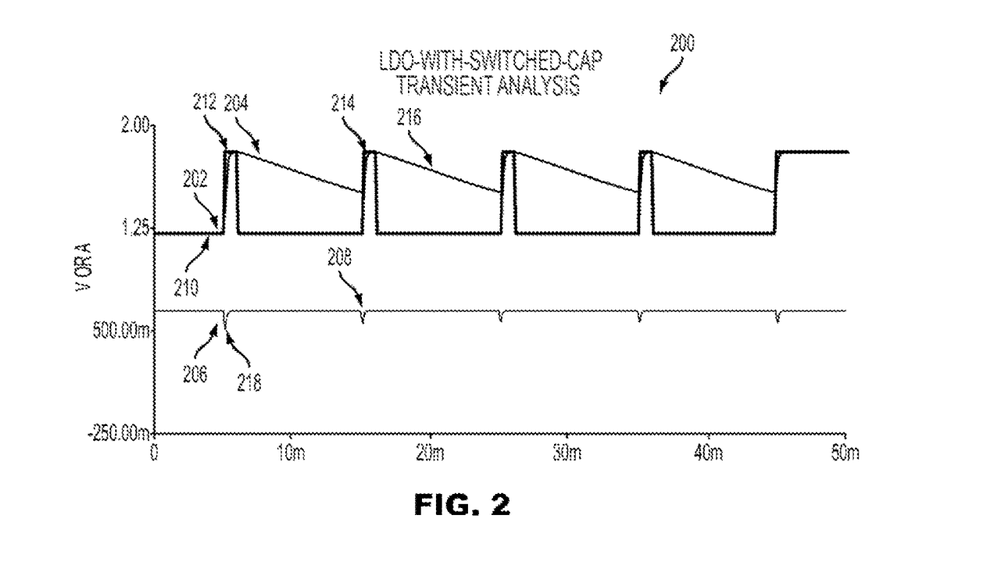
FIG. 2 illustrates a simulation signal plot of the power supply system of FIG. 1.

FIG. 2 illustrates a simulation signal plot 200 of the power supply system of FIG. 1. In this example, the signal plot is depicted over several output power state cycles, e.g., cycling from a first output power level (Vout1) to a second output power level (Vout2). In FIG. 2, signal 202 represents the output voltage of the power supply topology of FIG. 1, signal 204 represents an output voltage level of a conventional LDO-type power supply, signal 206 represents the bulk capacitance charging current of a conventional LDO-type power supply, and signal 208 represents the bulk capacitance charging current of the power supply topology of FIG. 1. In this example, the output voltage of the power supply topology of FIG. 1 (signal 202) transitions relatively quickly and relatively completely from a first output power state 210 to a second power output state 212, and vice-versa. In contrast, in the conventional LDO-type power supply, the output voltage (signal 204) lags 214 when transitioning from the first (lower) output power state 210 to the second (higher) output power state 212 since the bulk capacitor must be charged during this time period, and the output voltage (signal 202) also lags 216 when transitioning from the second (higher) output power state 212 to the first (lower) output power state 210 (and never actually reaches the second output power state) since the bulk capacitor is discharging. This charging and discharging of the bulk capacitor is of the conventional LDO-type power supply represents a current drain, as reflected in the negative current pulses 218 occurring during the transitional periods of signal 206. In contrast, the bulk capacitance control system of the present disclosure results in reduced or eliminated charging current, as depicted in signal 208 (i.e., signal 208 is relatively flat compared to signal 206).

Figure 3:
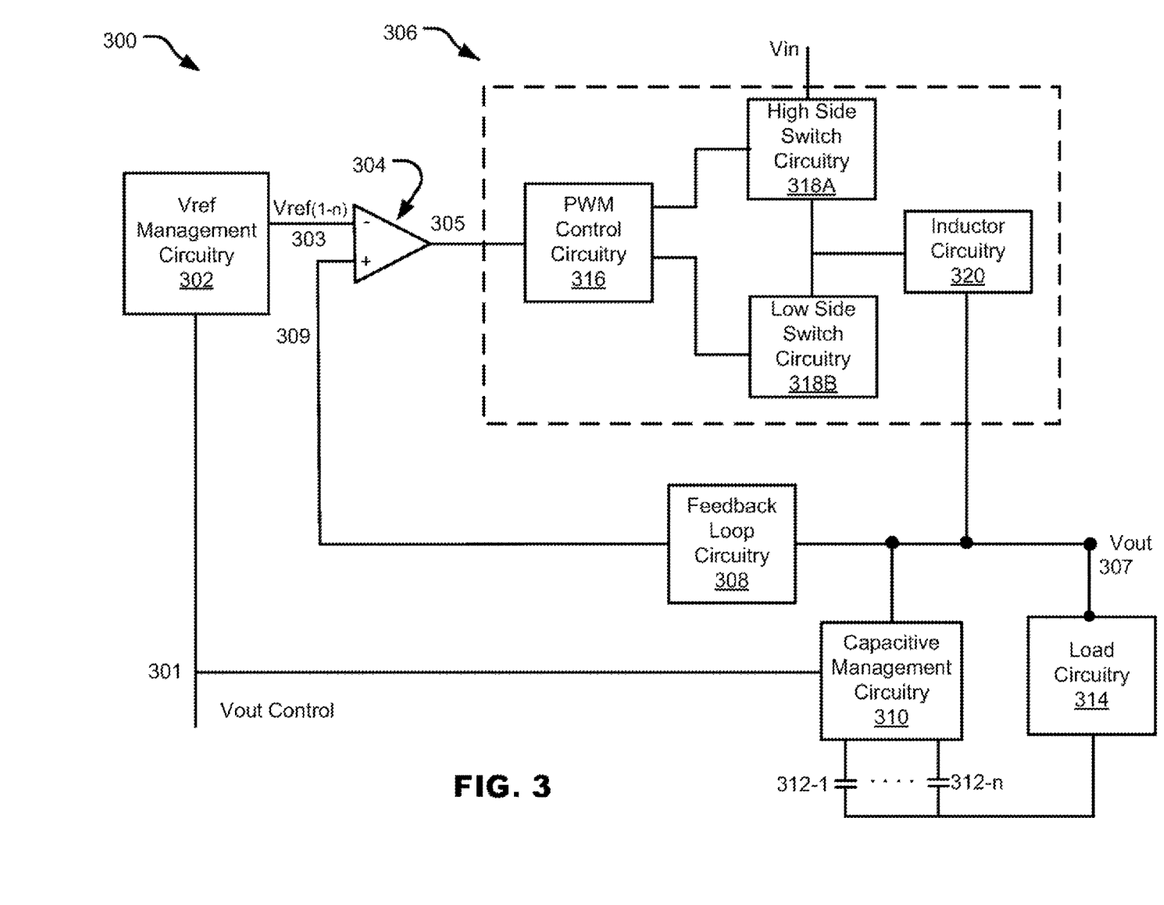
FIG. 3 illustrates another example of a power supply system consistent with various embodiments of the present disclosure.

FIG. 3 illustrates another example of a power supply system 300 consistent with various embodiments of the present disclosure. In this example, the power supply system 300 is a switched DC/DC converter power supply, for example, a Buck converter, a boost converter, a Buck-boost converter, etc. The system 300 includes reference voltage (Vref) management circuitry 302 configured to generate at least one reference signal (Vref(1-n)) 303 based on an output control signal (Vout control) 301. The system 300 also includes comparator circuitry 304 configured to compare the reference signal 303 to a feedback signal 309 indicative of, or proportional to, an output voltage Vout 307. System 300 also includes power switch circuitry 306 configured to generate the output voltage Vout 307 based on, at least in part, an input voltage Vin. The power switch circuitry 306 of this embodiment includes pulse width modulation (PWM) control circuitry 316, high side power switch circuitry 318A, low side power switch circuitry 318B and inductor circuitry 320. The high side power switch circuitry 318A, low side power switch circuitry 318B may each include a MOSFET switch and/or other switch technologies such as BJT, SiC, etc. The PWM control circuitry 316 is configured to generate a PWM control signal to control the conduction state of the high side switch circuitry 318A and a complimentary PWM control signal to control the conduction state of the low side switch circuitry 318B. In some embodiments, the PWM control circuitry 316 may also be configured to generate pulse frequency modulation (PFM) signals, and thus the power switch circuitry 306 may operate in a continuous (e.g., PWM, synchronous) and/or discontinuous (PFM) operating mode, based on the power demands of the power switch circuitry 306. An output signal 305 of the comparator circuitry 304 may be used to control a duty cycle of the PWM control circuitry 316, and thus, the duty cycles of the PWM and complimentary PWM signals. The output signal 305 may also be used to control a frequency of the PWM control circuitry 316, and thus, a frequency of the PFM signals and complimentary PFM signals. The inductor circuitry 320 generates a controllable output voltage Vout 307 that substantially matches a voltage level indicated by the reference signal 303. The system 300 may also include feedback loop circuitry 308 coupled between Vout 307 and the comparator circuitry 304 and configured to provide filtering and/or phase shifting for the feedback loop, for example, by filtering AC signal content of Vout 307 and controlling gain stability of the feedback loop to ensure negative feedback, level shifting and/or division of Vout, etc. The comparator circuitry 304, power switch circuitry 306 and feedback loop circuitry 308 may collectively be referred to herein as "power train circuitry".

Similar to the embodiment of FIG. 1, the output control signal 301 may be generated by a baseband power management system (e.g., baseband controller, not shown) and/or other power management system (not shown) and is generally indicative of, or proportional to, a desired output voltage Vout 307. For example, the output control signal 301 may include a first signal indicative of a full power state and a second signal indicative of a low power state. Vref management circuitry 302 may generate corresponding reference signals 303 based on the output control signal 301. Thus, Vref management circuitry 302 may generate a first reference signal 303 indicative of a full power operational state so that the output voltage 307 is a first output voltage level (Vout1) and a second reference signal indicative of a retention power saving state so that the output voltage 307 is a second output voltage level (Vout2), where Vout1>Vout2.

Also similar to the embodiment of FIG. 1, the output voltage 307 may be used to power load circuitry 314. The load circuitry may include, for example, IoT, wearable and/or other low-power devices, although the present disclosure is not limited to the type of load that may be coupled to the power train circuitry. The present disclosure includes a plurality of bulk capacitors 312-1, . . . , 312-n, which may be selected and coupled to the load circuitry 314. In some embodiments, the number of bulk capacitors 312-1, . . . , 312-n may generally correspond to the number of power states as reflected by the number of different reference signals 303 that may be generated based on the output control signal 301. The system 300 also includes capacitive management circuitry 310 configured to control the precharge of the the plurality of bulk capacitors 312-1, . . . , 312-n and couple at least one of the plurality of capacitors 312-1, . . . , 312-n to the load circuitry based on the output control signal 301. In some embodiments, the capacitive management circuitry 310 is configured to precharge each respective bulk capacitor 312-1, . . . , 312-n to a corresponding output voltage level. For example, the capacitive management circuitry may be configured to precharge a first bulk capacitor (e.g., 312-1) to a first voltage level that corresponds to the first output voltage (Vout1) 307 generated using the first reference voltage Vref1 303 and a second bulk capacitor (e.g., 312-2) to a second voltage level that corresponds to the second output voltage (Vout2) 307 generated using the second reference voltage Vref2, etc. In operation, control signal 301 may command Vref management circuitry 302 to change output power states (e.g., from Vout1 to Vout2, or vice-versa), the capacitive management circuitry 310 may couple a selected bulk capacitor 312-1, . . . , 312-n to the load circuitry 314 that is precharged to the selected output power state, and decouple the bulk capacitor 312-1, . . . , 312-n associated with the previous output power state from the load circuitry 314. Thus, power drain associated with charging and discharging the capacitors 312-1, . . . , 312-n when cycling between power states may be reduced or eliminated, and thus significant power savings may be realized when transitioning (cycling) between power states.

Switching between power states may be synchronized to the start of the PWM and/or PFM signals. Thus, in some embodiments, the capacitive management circuitry 316 may receive control information from the PWM control circuitry 316 indicating a start of a PWM signal cycle, and may switch to the appropriate bulk capacitor 312-1, . . . , 312-n based, on, at least in part, the control information from the PWM control circuitry 316.

Also similar to the embodiment of FIG. 1, each bulk capacitor 312-1, . . . , 312-n may be precharged during prior operational cycles of the power supply system 300. In this regard, when a bulk capacitor 312-1, . . . , 312-n is decoupled from the load circuitry 314, it may remain in an open circuit configuration so that the charge on any decoupled bulk capacitor 312-1, . . . , 312-n remains relatively stable for the next power cycle. To that end, the capacitance of each bulk capacitor 312-1, . . . , 312-n may be sized so that the time constant associated with a bulk capacitor is larger than the cycling time between output voltage modes. In still other embodiments, the power supply system of FIG. 3 may be controlled for initialization operations during which the bulk capacitors 312-1, . . . , 312-n are each charged to an appropriate level. In some embodiments, at least one bulk capacitor 312-1, . . . , 312-n may be formed of a plurality of individual capacitors coupled in a parallel and/or series. In such an embodiment, the capacitive management circuitry 310 may be configured to couple the plurality of capacitors of a bulk capacitor (e.g., 312-1) in series for a first output power state and in parallel for a second output power state. Also in such an embodiment, each of the plurality of capacitors of the bulk capacitor may be precharged to the same level, e.g., Vout1, and the capacitive management circuitry 310 may couple the plurality of capacitors in series when control signal 301 indicates the first output voltage (Vout1) and in parallel when the control signal 301 indicates the second voltage level (e.g., Vout2). Of course, in other embodiments, hybrid series/parallel coupling may be used. Such embodiments may avoid any momentary loss of capacitive load when switching from a first output voltage state to a second output voltage state, and avoid charging each bulk capacitor to a separate precharge level. While the above examples make specific reference to a first and second output voltage state, and thus first and second capacitors 312-1 and 312-2, it should be understood that the power supply system 300 of the present disclosure may enable three or more output voltage levels, and thus, three or more bulk capacitors may be used. The signal plot of FIG. 2 similarly represents the comparison between the switched power supply 300 of FIG. 3 and a conventional switched power supply.

Figure 4:
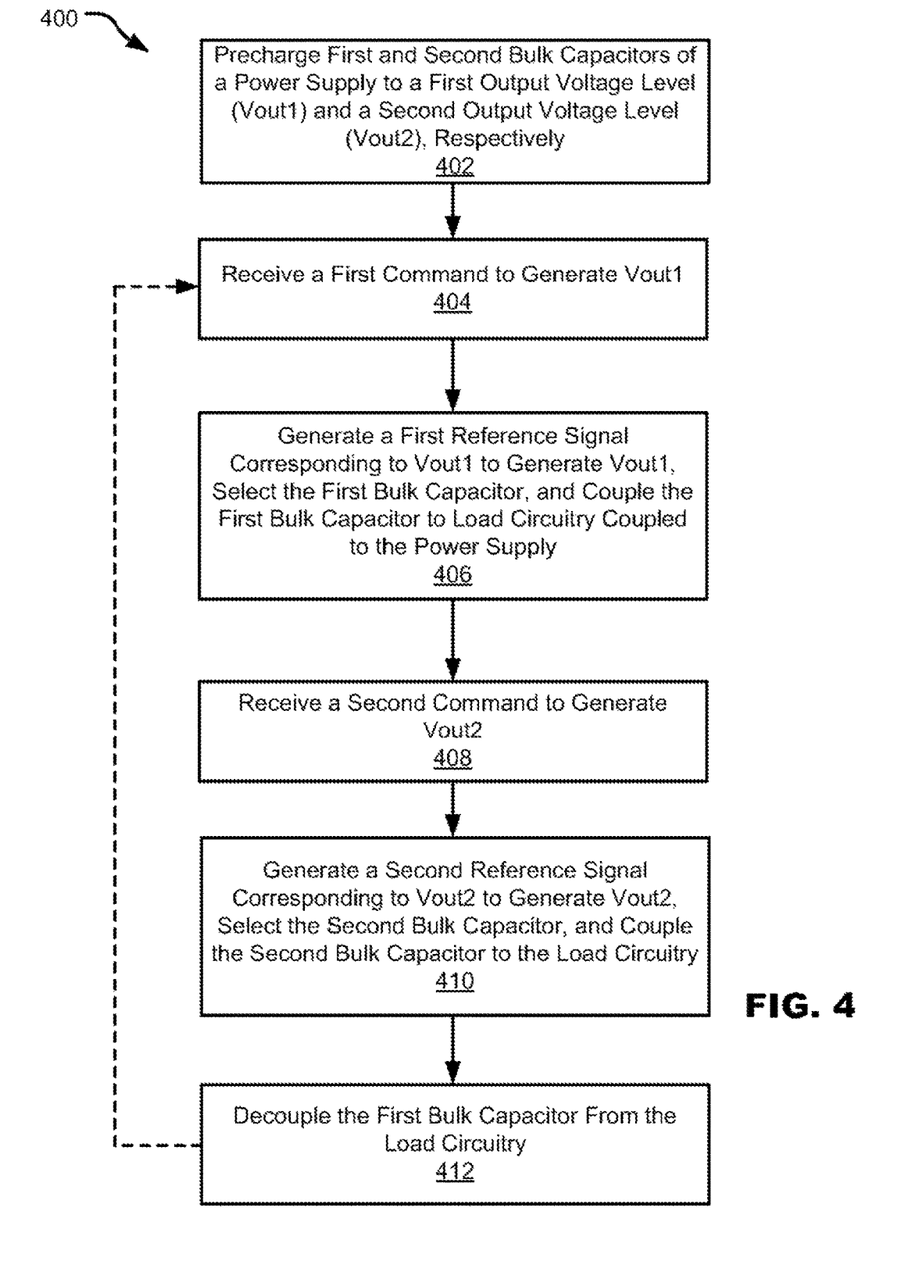
FIG. 4 is a flowchart of operations according to one embodiment of the present disclosure.

FIG. 4 is a flowchart 300 of operations according to one embodiment of the present disclosure. This embodiment illustrates operations of switching bulk capacitors based on a desired output voltage level, and may apply to the linear regulator power supply of FIG. 1 and/or the switched power supply of FIG. 3 having first and second operational states, e.g., first and second output power states (Vout1 and Vout2). Operations of this embodiment may include precharging a first bulk capacitor to approximately a first output voltage level (Vout1) and precharging a second bulk capacitor to approximately a second voltage level (Vout2) 402. Operations may also include receiving a first command to generate Vout1 404. Operations further include generating a first reference signal corresponding to Vout1 to generate Vout1 and selecting the first bulk capacitor and coupling the first bulk capacitor to load circuitry 406. Operations may also include receiving a second command to generate Vout2 408. Operations may further include generating a second reference signal corresponding to Vout2 to generate Vout2 and selecting the second bulk capacitor and coupling the second bulk capacitor to load circuitry 410. Operations may also include decoupling the first bulk capacitor from the load circuitry 412. These operations may be repeated as the power supply cycles between Vout1 and Vout2.

Figure 5:
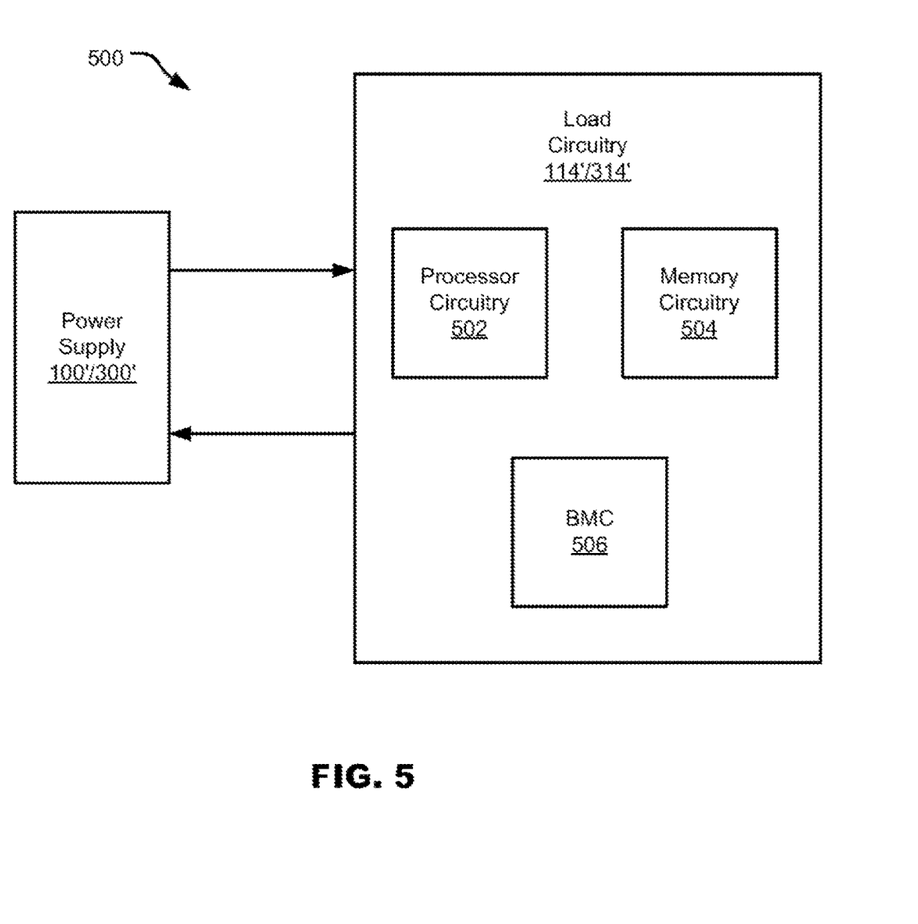
FIG. 5 illustrates another example of a power supply system consistent with various embodiments of the present disclosure.

FIG. 5 illustrates another example of a power supply system 500 consistent with various embodiments of the present disclosure. In this system embodiment, the load circuitry 114'/314' is a wearable and/or IoT device that includes processor circuitry 502, memory circuitry 504 and baseband management controller (BMC) module 506. The power supply circuitry 100'/300' is configured to deliver power to at least one element of the load circuitry 114'/314', and further configured to communicate with the BMC module 506 to receive, for example, output voltage control signal 101'/301' and/or communicate with processor circuitry 502.

The foregoing is prided as exemplary system architectures and methodologies, modifications to the present disclosure are possible. In some embodiments, the Vref management circuitry 102/302 and/or the capacitive management circuitry 110/310 may be coupled to the output control signal 101/301 via a bus (not shown). The bus may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, the bus instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, the bus may comprise other types and configurations of bus systems, without departing from this embodiment.

In addition to the processor circuitry 502 and the memory circuitry 504 of FIG. 5, the Vref management circuitry 102/302 and/or the capacitive management circuitry 110/310 may include memory and/or processing systems. The memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, the memory may comprise other and/or later-developed types of computer-readable memory.

Embodiments of the operations described herein may be implemented in a storage devices having stored thereon instructions that when executed by one or more processors perform the methods. The processor may include, for example, a processing unit (e.g., processor 502) and/or programmable circuitry in the Vref management circuitry 102/302 and/or the capacitive management circuitry 110/310 and/or other circuitry in communication with, or associated with, a power supply system. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

In some embodiments, a hardware description language may be used to specify circuit and/or logic implementation for the various circuitry described herein. For example, in one embodiment the hardware description language may comply or be compatable with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

"Circuitry", as used in any embodiment herein, may comprise, for example, singly or in any combination, hardwired circuitry, programmable circuitry, state machine circuitry, and/or firmware that stores instructions executed by programmable circuitry.

Examples of the present disclosure include subject material such as a method, means for performing acts of the method, a device, at least one machine-readable device, including instructions that when performed by a machine cause the machine to perform acts of a method, or of an apparatus or system to manage bulk capacitance in a power supply system, as discussed below.

EXAMPLES

Examples of the present disclosure include subject material such as a method, means for performing acts of the method, a device, a computer-readable storage device having stored thereon instructions that when executed by one or more processors result in operations of the method, or of an apparatus or system related to power supply topologies with capacitance management, as discussed below.

Example 1

According to this example there is provided a power supply system comprising that includes power train circuitry configured to generate a first output voltage level and a second output voltage level, based on, at least in part, a first output level control signal and a second output level control signal, respectively, to deliver power to load circuitry coupled to the power train circuitry; first bulk capacitor circuitry and a second bulk capacitor circuitry; wherein the first bulk capacitor circuitry is configured to be precharged to approximately the first output voltage level and the second bulk capacitor circuitry is configured to be precharged to approximately the second output voltage level; and capacitive management circuitry configured to couple the first bulk capacitor to the load circuitry based on the first output level control signal, or to couple the second bulk capacitor to load circuitry based on the second output level control signal.

Example 2

This example includes the elements of example 1, and further includes reference signal management circuitry configured to generate a first reference signal, in response to the first output level control signal, to control the power train circuitry to generate the first output voltage level; and to generate a second reference signal, in response to the second output level control signal, to control the power train circuitry to generate the second output voltage level.

Example 3

This example includes the elements of example 2, wherein the power train circuitry comprises comparator circuitry configured to compare the first and second reference signals to the first and second output voltage levels, respectively.

Example 4

This example includes the elements of example 3, wherein the power train circuitry further comprises power switch circuitry coupled to an input voltage source and wherein a conduction state of the power switch circuitry is configured to be controlled by an output of the comparator circuitry to generate the first output voltage level or the second output voltage level.

Example 5

This example includes the elements of example 3, wherein the power train circuitry further comprises pulse width modulation (PWM) control circuitry, high side switch circuitry and low side switch circuitry; wherein the PWM control circuitry is configured to generate a PWM signal to control a conduction state of the high side switch circuitry and a complimentary PWM signal to control a conduction state of the low side switch circuitry; wherein a duty cycle of the PWM signal is controlled by an output of the comparator circuitry to generate the first output voltage level or the second output voltage level.

Example 6

This example includes the elements according to any one of examples 1 through 5, wherein the first bulk capacitor circuitry comprises a plurality of capacitors, and wherein the capacitive management circuitry is configured to couple the plurality of capacitors in series in response to the first output level control signal and in parallel in response to the second output level control signal.

Example 7

This example includes the elements according to any one of examples 1 through 5, wherein the power train circuitry is further configured to cycle between the first output voltage level and the second output voltage level, based on, at least in part, the first output level control signal and the second output level control signal, respectively.

Example 8

This example includes the elements according to any one of examples 1 through 5, wherein the capacitive management circuitry is further configured to decouple the first bulk capacitance from the load circuitry when the second bulk capacitance is coupled to the load circuitry, and decouple the second bulk capacitance from the load circuitry when the first bulk capacitance is coupled to the load circuitry.

Example 9

According to this example there is provided a method for managing bulk capacitance of a power supply system. the method includes precharging first and second bulk capacitors of the power supply system to approximately a first output voltage level and a second output voltage level, respectively; receiving a first command signal to generate, by the power supply, the first output voltage level; coupling the first bulk capacitance to load circuitry coupled to the power supply; receiving a second command signal to generate, by the power supply, the second output voltage level; and coupling the second bulk capacitance to the load circuitry coupled to the power supply.

Example 10

This example includes the elements of example 9, and further includes generating a first reference signal, in response to the first command signal, to control the power supply system to generate the first output voltage level; and generating a second reference signal, in response to the second command signal, to control the power supply circuitry to generate the second output voltage level.

Example 11

This example includes the elements of example 10, and further includes comparing the first and second reference signals to the first and second output voltage levels, respectively.

Example 12

This example includes the elements of example 11, and further includes controlling, by a result of the comparing, power switch circuitry to generate the first output voltage level or the second output voltage level.

Example 13

This example includes the elements of example 11, and further includes controlling, by a result of the comparing, PWM control circuitry to generate a PWM signal to control a conduction state of high side switch circuitry and a complimentary PWM signal to control a conduction state of low side switch circuitry; wherein a duty cycle of the PWM signal is controlled by the result of the comparing to generate the first output voltage level or the second output voltage level.

Example 14

This example includes the elements according to any one of examples 9 through 13, wherein the first bulk capacitor circuitry comprises a plurality of capacitors, and wherein the method further comprises: coupling the plurality of capacitors in series in response to the first command signal and in parallel in response to the second command signal.

Example 15

This example includes the elements according to any one of examples 9 through 13, and further cycling between the first output voltage level and the second output voltage level, based on, at least in part, the first command signal and the second command signal, respectively.

Example 16

This example includes the elements according to any one of examples 9 through 13, and further includes decoupling the first bulk capacitance from the load circuitry when the second bulk capacitance is coupled to the load circuitry, and decoupling the second bulk capacitance from the load circuitry when the first bulk capacitance is coupled to the load circuitry.

Example 17

This example includes a machine-readable storage device having stored thereon instructions that when executed by one or more processors result in the following operations including: precharge first and second bulk capacitors of the power supply system to approximately a first output voltage level and a second output voltage level, respectively; receive a first command signal to generate, by the power supply, the first output voltage level; couple the first bulk capacitance to load circuitry coupled to the power supply; receive a second command signal to generate, by the power supply, the second output voltage level; and couple the second bulk capacitance to load circuitry coupled to the power supply.

Example 18

This example includes the elements of example 17, wherein the instructions that when executed by one or more processors results in the following additional operations including generate a first reference signal, in response to the first command signal, to control the power supply system to generate the first output voltage level; and to generate a second reference signal, in response to the second command signal, to control the power supply circuitry to generate the second output voltage level.

Example 19

This example includes the elements of example 18, wherein the instructions that when executed by one or more processors results in the following additional operations including compare the first and second reference signals to the first and second output voltage levels, respectively.

Example 20

This example includes the elements of example 19, wherein the instructions that when executed by one or more processors results in the following additional operations including control, by a result of the comparing, power switch circuitry to generate the first output voltage level or the second output voltage level.

Example 21

This example includes the elements of example 19 wherein the instructions that when executed by one or more processors results in the following additional operations including control, by a result of the comparing, PWM control circuitry to generate a PWM signal to control a conduction state of high side switch circuitry and a complimentary PWM signal to control a conduction state of low side switch circuitry; wherein a duty cycle of the PWM signal is controlled by the result of the comparing to generate the first output voltage level or the second output voltage level.

Example 22

This example includes the elements according to any one of examples 17 through 21, wherein the first bulk capacitor circuitry comprises a plurality of capacitors, and wherein the wherein the instructions that when executed by one or more processors results in the following additional operations including couple the plurality of capacitors in series in response to the first command signal and in parallel in response to the second command signal.

Example 23

This example includes the elements according to any one of examples 17 through 21, wherein the instructions that when executed by one or more processors results in the following additional operations including cycle between the first output voltage level and the second output voltage level, based on, at least in part, the first command signal and the second command signal, respectively.

Example 24

This example includes the elements according to any one of examples 17 through 21, wherein the instructions that when executed by one or more processors results in the following additional operations including decouple the first bulk capacitance from the load circuitry when the second bulk capacitance is coupled to the load circuitry, and decouple the second bulk capacitance from the load circuitry when the first bulk capacitance is coupled to the load circuitry.

Example 25

According to this example there is provided a machine-readable storage device having stored thereon instructions that when executed by one or more processors result in the following operations including the method according to any one of examples 9 to 16.

Example 26

Another example of the present disclosure is a system including at least one device arranged to perform the method of any one of examples 9-16.

Example 27

Another example of the present disclosure is a device including means to perform the method of any one of examples 9-16.

Example 28

This example includes the elements according to any one of examples 9 through 16, wherein the power train circuitry is a linear regulator power supply.

Example 29

This example includes the elements according to any one of examples 9 through 16, wherein the power train circuitry is a switched DC/DC converter power supply.

Example 30

This example includes system. The system includes power supply and load circuitry; the power supply system comprising: power train circuitry configured to generate a first output voltage level and a second output voltage level, based on, at least in part, a first output level control signal and a second output level control signal, respectively, to deliver power to the load circuitry coupled to the power train circuitry; first bulk capacitor circuitry and a second bulk capacitor circuitry; wherein the first bulk capacitor circuitry is configured to be precharged to approximately the first output voltage level and the second bulk capacitor circuitry is configured to be precharged to approximately the second output voltage level; and capacitive management circuitry configured to couple the first bulk capacitor to the load circuitry based on the first output level control signal, or to couple the second bulk capacitor to the load circuitry based on the second output level control signal; and wherein the load circuitry comprising processor circuitry and memory circuitry.

Example 31

This example includes the elements according to example 30, wherein the first bulk capacitor circuitry comprises a plurality of capacitors, and wherein the capacitive management circuitry is configured to couple the plurality of capacitors in series in response to the first output level control signal and in parallel in response to the second output level control signal.

Example 32

This example includes the elements according to example 30, wherein the power train circuitry is further configured to cycle between the first output voltage level and the second output voltage level, based on, at least in part, the first output level control signal and the second output level control signal, respectively.

Example 33

This example includes the elements according to example 30, wherein the capacitive management circuitry is further configured to decouple the first bulk capacitance from the load circuitry when the second bulk capacitance is coupled to the load circuitry, and decouple the second bulk capacitance from the load circuitry when the first bulk capacitance is coupled to the load circuitry.

Example 34

This example includes the elements according to example 30, wherein the load circuitry is an Internet of Things (IoT) device.

Example 35

This example includes the elements according to example 30, wherein the load circuitry is a wearable device.

Example 36

This example includes the elements according to example 30, wherein the load circuitry further comprises baseband management controller circuitry configured to generate the first output level control signal and the second output level control signal.

Example 37

This example includes the elements according to example 30, wherein the power train circuitry is a linear regulator power supply.

Example 38

This example includes the elements according to example 30, wherein the power train circuitry is a switched DC/DC converter power supply.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A power supply system comprising:
power train circuitry configured to generate a first output voltage level associated with a full power state and a second output voltage level associated with a low power state, based on, at least in part, a first output level control signal and a second output level control signal, respectively, to deliver power to load circuitry coupled to the power train circuitry, wherein the first output voltage level is greater than the second output voltage level;
first bulk capacitor circuitry and a second bulk capacitor circuitry, wherein the first bulk capacitor circuitry comprises a plurality of capacitors, and wherein the first bulk capacitor circuitry is configured to be precharged to approximately the first output voltage level and the second bulk capacitor circuitry is configured to be precharged to approximately the second output voltage level;
capacitive management circuitry configured to couple the first bulk capacitor circuitry to the load circuitry based on the first output level control signal, the first output level control signal being proportional to the first output voltage level, or to couple the second bulk capacitor circuitry to load circuitry based on the second output level control signal, the second output level control signal being proportional to the second output voltage level; and
wherein the capacitive management circuitry is configured to electrically couple each of the plurality of capacitors in series with each other in response to the first output level control signal and to electrically couple each of the plurality of capacitors in parallel with each other in response to the second output level control signal.

2. The power supply system of claim 1, further comprising:
reference signal management circuitry configured to generate a first reference signal, in response to the first output level control signal, to control the power train circuitry to generate the first output voltage level; and to generate a second reference signal, in response to the second output level control signal, to control the power train circuitry to generate the second output voltage level.

3. The power supply system of claim 2, wherein the power train circuitry comprises comparator circuitry configured to compare the first and second reference signals to the first and second output voltage levels, respectively.

4. The power supply system of claim 3, wherein the power train circuitry further comprises power switch circuitry coupled to an input voltage source and wherein a conduction state of the power switch circuitry is configured to be controlled by an output of the comparator circuitry to generate the first output voltage level or the second output voltage level.

5. The power supply system of claim 3, wherein the power train circuitry further comprises pulse width modulation (PWM) control circuitry, high side switch circuitry and low side switch circuitry; wherein the PWM control circuitry is configured to generate a PWM signal to control a conduction state of the high side switch circuitry and a complimentary PWM signal to control a conduction state of the low side switch circuitry; wherein a duty cycle of the PWM signal is controlled by an output of the comparator circuitry to generate the first output voltage level or the second output voltage level.

6. The power supply system of claim 1, wherein the power train circuitry is further configured to cycle between the first output voltage level and the second output voltage level, based on, at least in part, the first output level control signal and the second output level control signal, respectively.

7. The power supply system of claim 1, wherein the capacitive management circuitry is further configured to decouple the first bulk capacitor circuitry from the load circuitry when the second bulk capacitor circuitry is coupled to the load circuitry, and decouple the second bulk capacitor circuitry from the load circuitry when the first bulk capacitor circuitry is coupled to the load circuitry.

8. A method for managing bulk capacitance of a power supply system, comprising:
precharging first and second bulk capacitors of the power supply system to approximately a first output voltage level associated with a full power state and a second output voltage level associated with a low power state, respectively, wherein the first bulk capacitor comprises a plurality of capacitors, and wherein the first output voltage level is greater than the second output voltage level;
receiving a first command signal to generate, by the power supply system, the first output voltage level, the first command signal being proportional to the first output voltage level;
in response to receiving the first command signal, coupling the first bulk capacitor to load circuitry coupled to the power supply and electrically coupling the plurality of capacitors in series with each other;
receiving a second command signal to generate, by the power supply, the second output voltage level, the second command signal being proportional to the second output voltage level; and
in response to receiving the second command signal, coupling the second bulk capacitor to the load circuitry coupled to the power supply and electrically coupling the plurality of capacitors in parallel with each other.

9. The method of claim 8, further comprising:
generating a first reference signal, in response to the first command signal, to control the power supply system to generate the first output voltage level; and generating a second reference signal, in response to the second command signal, to control the power supply system to generate the second output voltage level.

10. The method of claim 9, further comprising:
comparing the first and second reference signals to the first and second output voltage levels, respectively.

11. The method of claim 10, further comprising:
controlling, by a result of the comparing, power switch circuitry to generate the first output voltage level or the second output voltage level.

12. The method of claim 10, further comprising:
controlling, by a result of the comparing, PWM control circuitry to generate a PWM signal to control a conduction state of high side switch circuitry and a complimentary PWM signal to control a conduction state of low side switch circuitry; wherein a duty cycle of the PWM signal is controlled by the result of the comparing to generate the first output voltage level or the second output voltage level.

13. The method of claim 8, further comprising cycling between the first output voltage level and the second output voltage level, based on, at least in part, the first command signal and the second command signal, respectively.

14. The method of claim 8, further comprising decoupling the first bulk capacitor from the load circuitry when the second bulk capacitor is coupled to the load circuitry, and decoupling the second bulk capacitor from the load circuitry when the first bulk capacitor is coupled to the load circuitry.

15. A system, comprising:
a power supply and load circuitry, the power supply comprising:
power train circuitry configured to generate a first output voltage level associated with a full power state and a second output voltage level associated with a low power state, based on, at least in part, a first output level control signal and a second output level control signal, respectively, to deliver power to the load circuitry coupled to the power train circuitry, wherein the first output voltage level is greater than the second output voltage level;
first bulk capacitor circuitry and a second bulk capacitor circuitry, wherein the first bulk capacitor circuitry comprises a plurality of capacitors, and wherein the first bulk capacitor circuitry is configured to be precharged to approximately the first output voltage level and the second bulk capacitor circuitry is configured to be precharged to approximately the second output voltage level; and
capacitive management circuitry configured to:
in response to the first output level control signal, couple the first bulk capacitor circuitry to the load circuitry, and electrically couple the plurality of capacitors in series with each other, the first output level control signal being proportional to the first output voltage level; and,
in response to the second output level control signal, couple the second bulk capacitor circuitry to the load circuitry, and electrically couple the plurality of capacitors in parallel with each other, the second output level control signal being proportional to the second output voltage level; and
wherein the load circuitry comprising processor circuitry and memory circuitry.

16. The system of claim 15, wherein the power train circuitry is further configured to cycle between the first output voltage level and the second output voltage level, based on, at least in part, the first output level control signal and the second output level control signal, respectively.

17. The system of claim 15, wherein the capacitive management circuitry is further configured to decouple the first bulk capacitor circuitry from the load circuitry when the second bulk capacitor circuitry is coupled to the load circuitry, and decouple the second bulk capacitor circuitry from the load circuitry when the first bulk capacitor circuitry is coupled to the load circuitry.

18. The system of claim 15, wherein the load circuitry is an Internet of Things (IoT) device.

19. The system of claim 15, wherein the load circuitry is a wearable device.

20. The system of claim 15, wherein the load circuitry further comprises baseband management controller circuitry configured to generate the first output level control signal and the second output level control signal.

21. The system of claim 15, wherein the power train circuitry is a linear regulator power supply.

22. The system of claim 15, wherein the power train circuitry is a switched DC/DC converter power supply.

* * * * *